April 16, 1957 V. RAWLS ET AL 2,788,851
APPARATUS FOR AUTOMATICALLY BUFFING PNEUMATIC TIRE CASINGS
Filed May 16, 1955 6 Sheets-Sheet 6
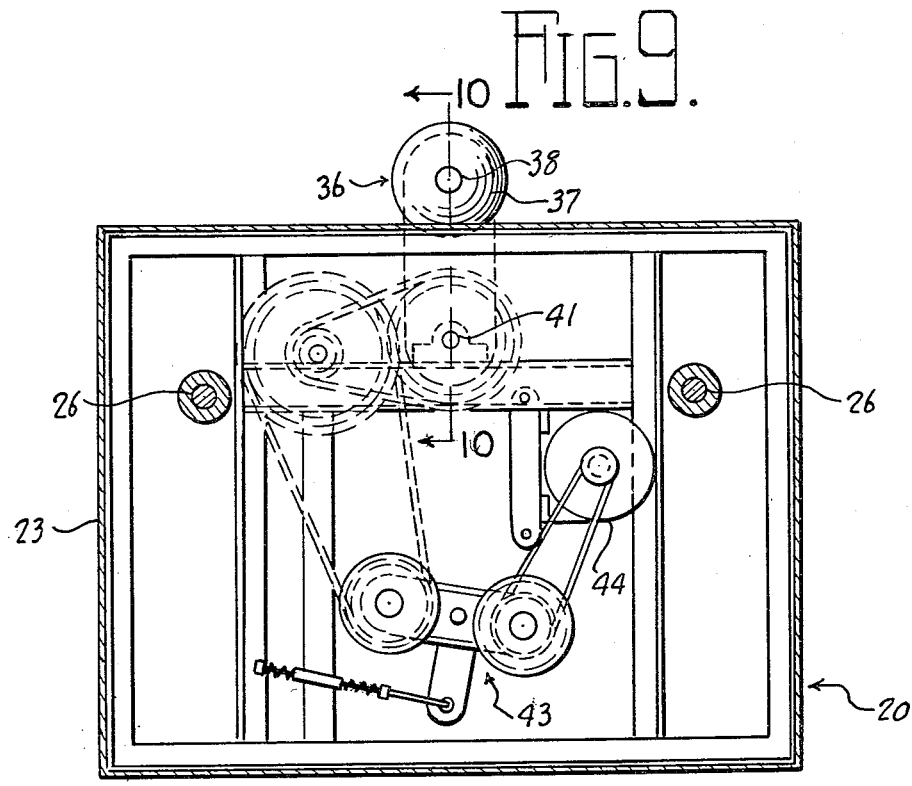
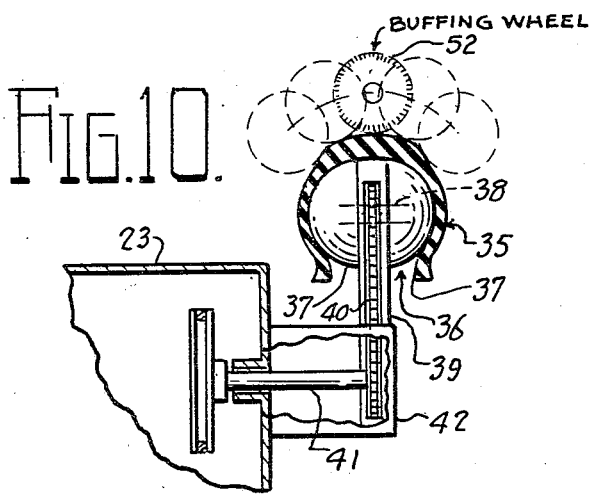
INVENTORS
Vaughn Rawls
Robert W. LaWarre
BY
Owen & Owen
ATTORNEYS : 2,788,851
Patented Apr. 16, 1957

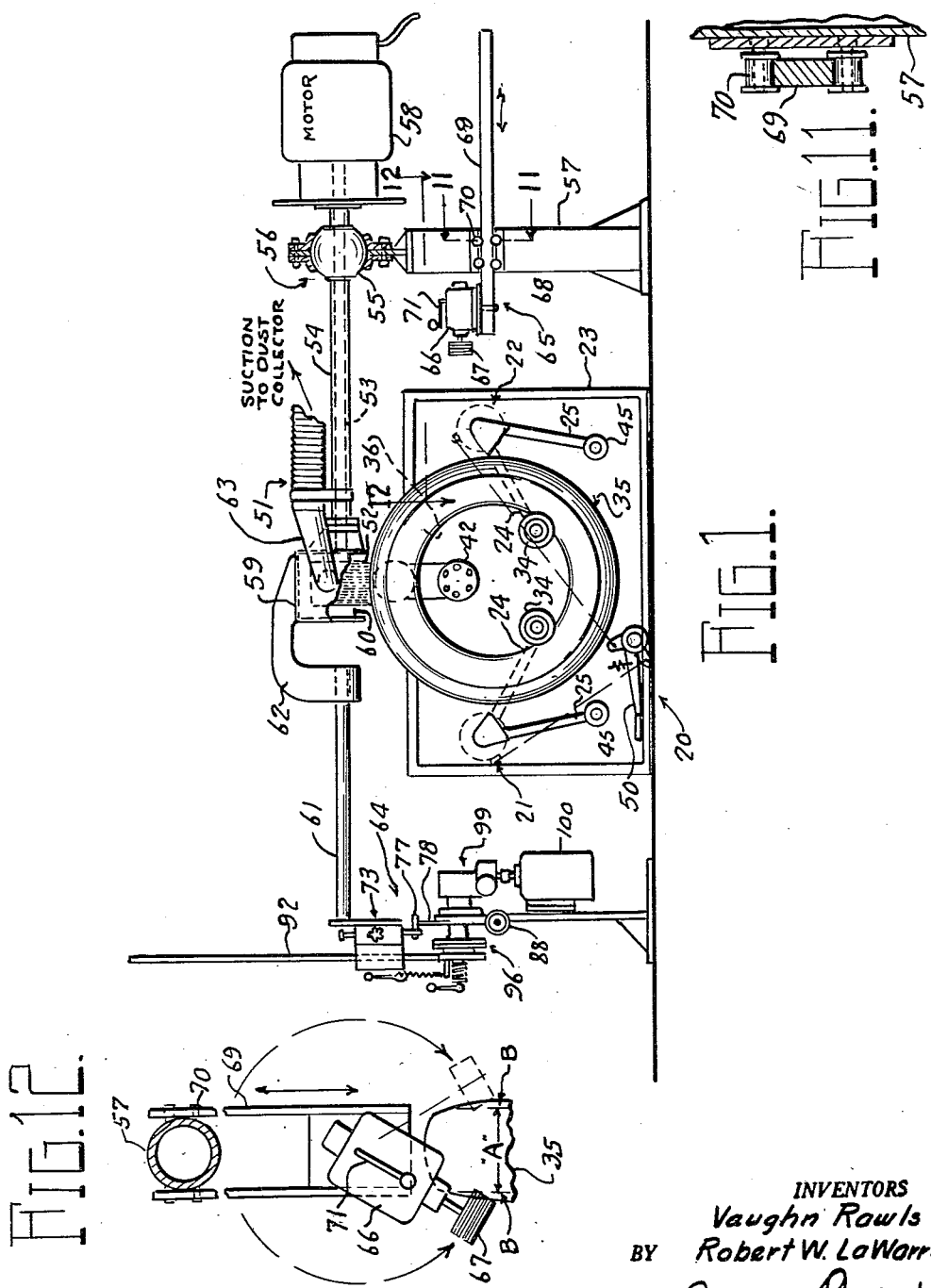

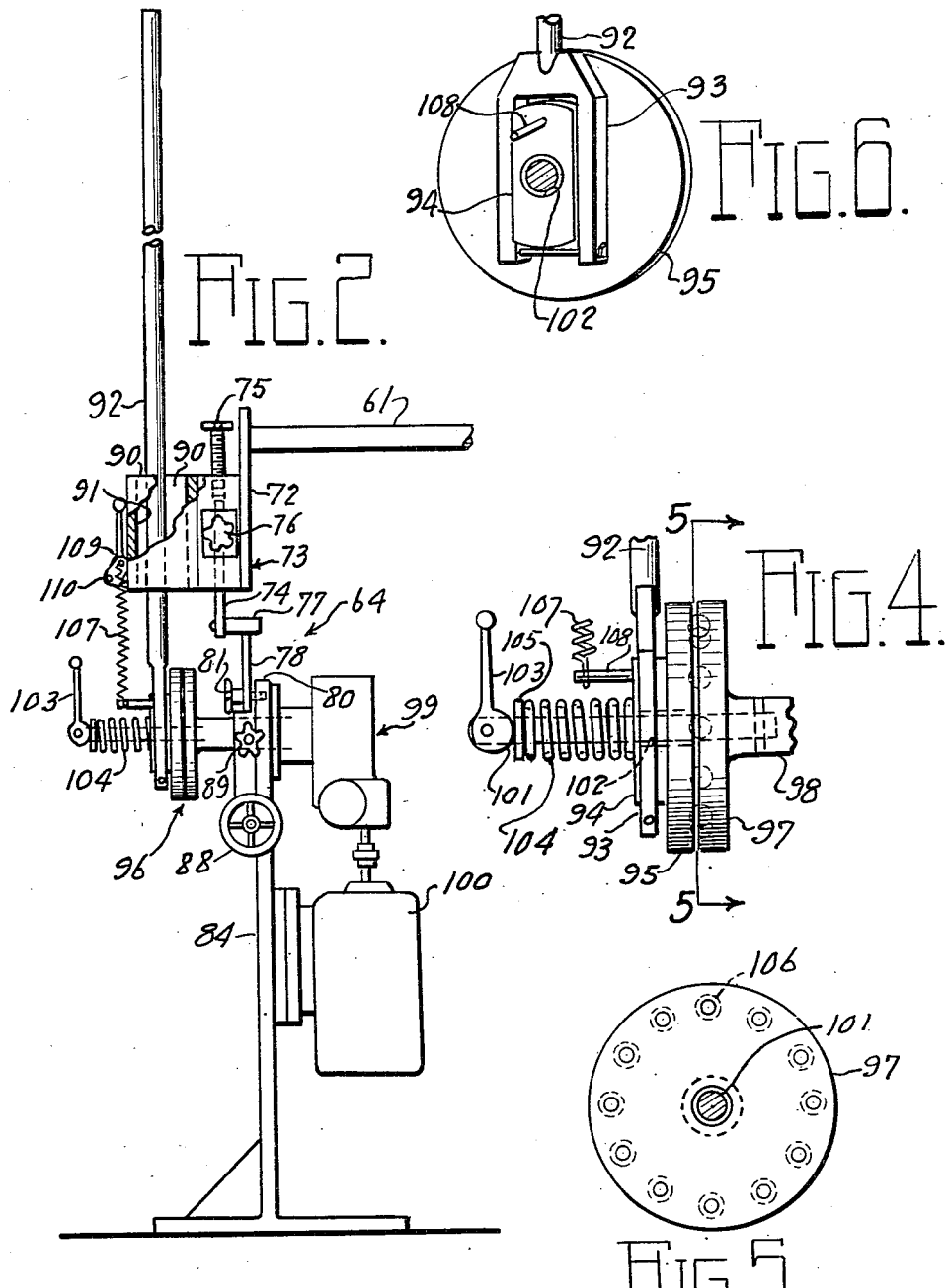

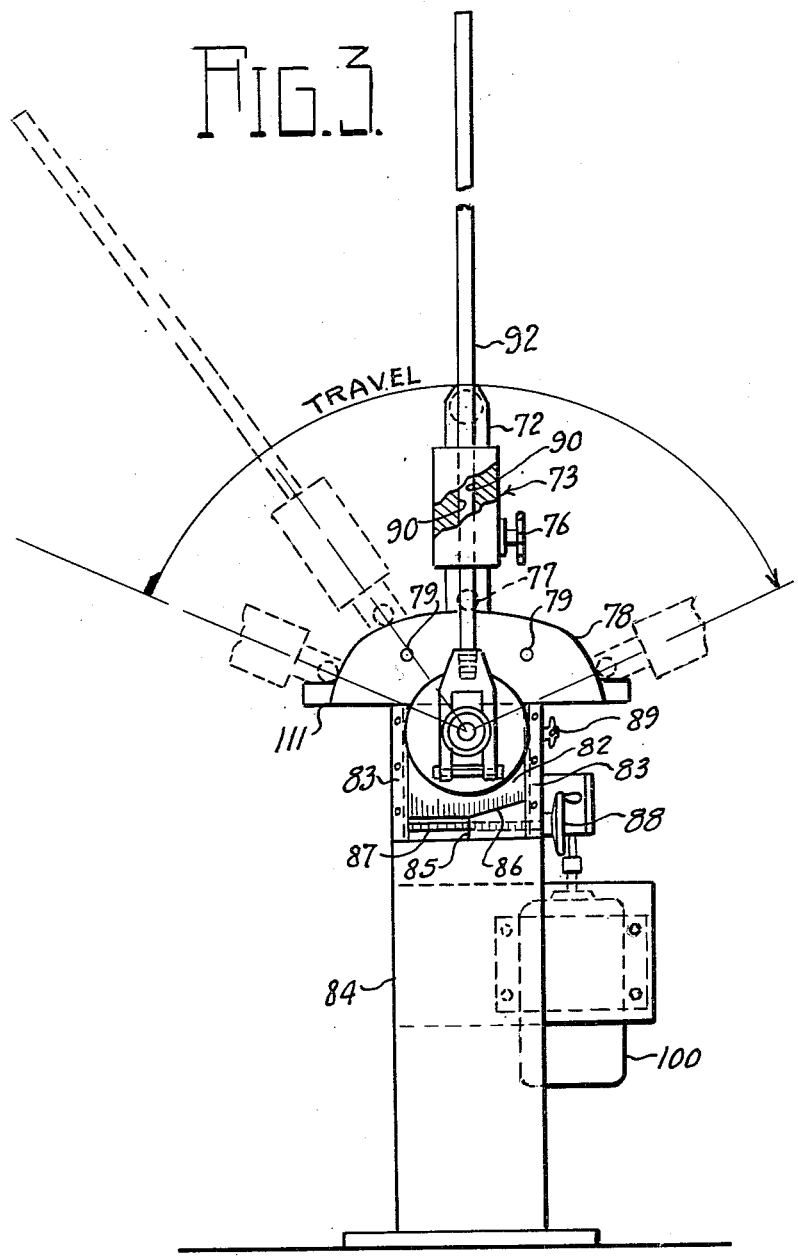

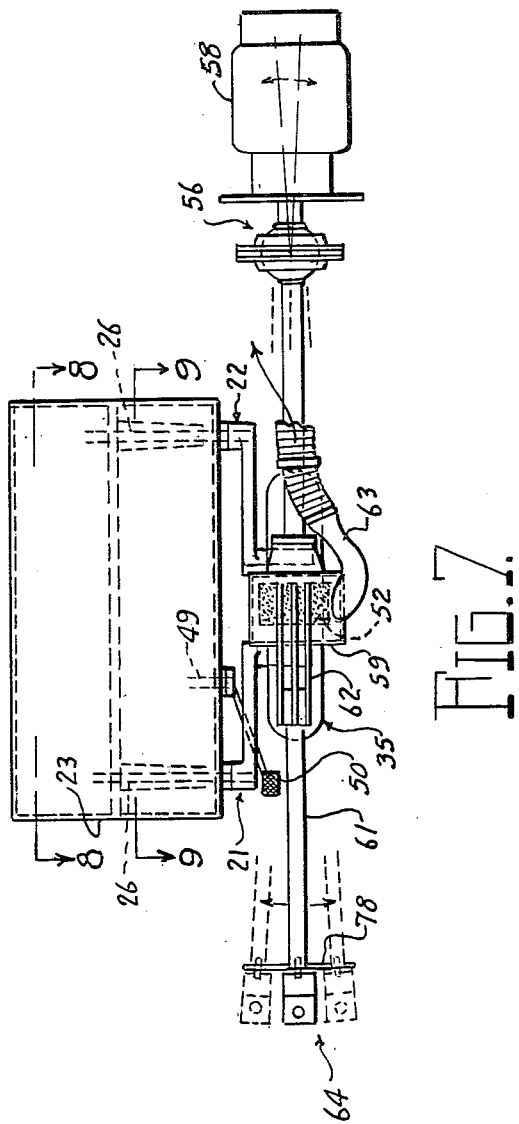

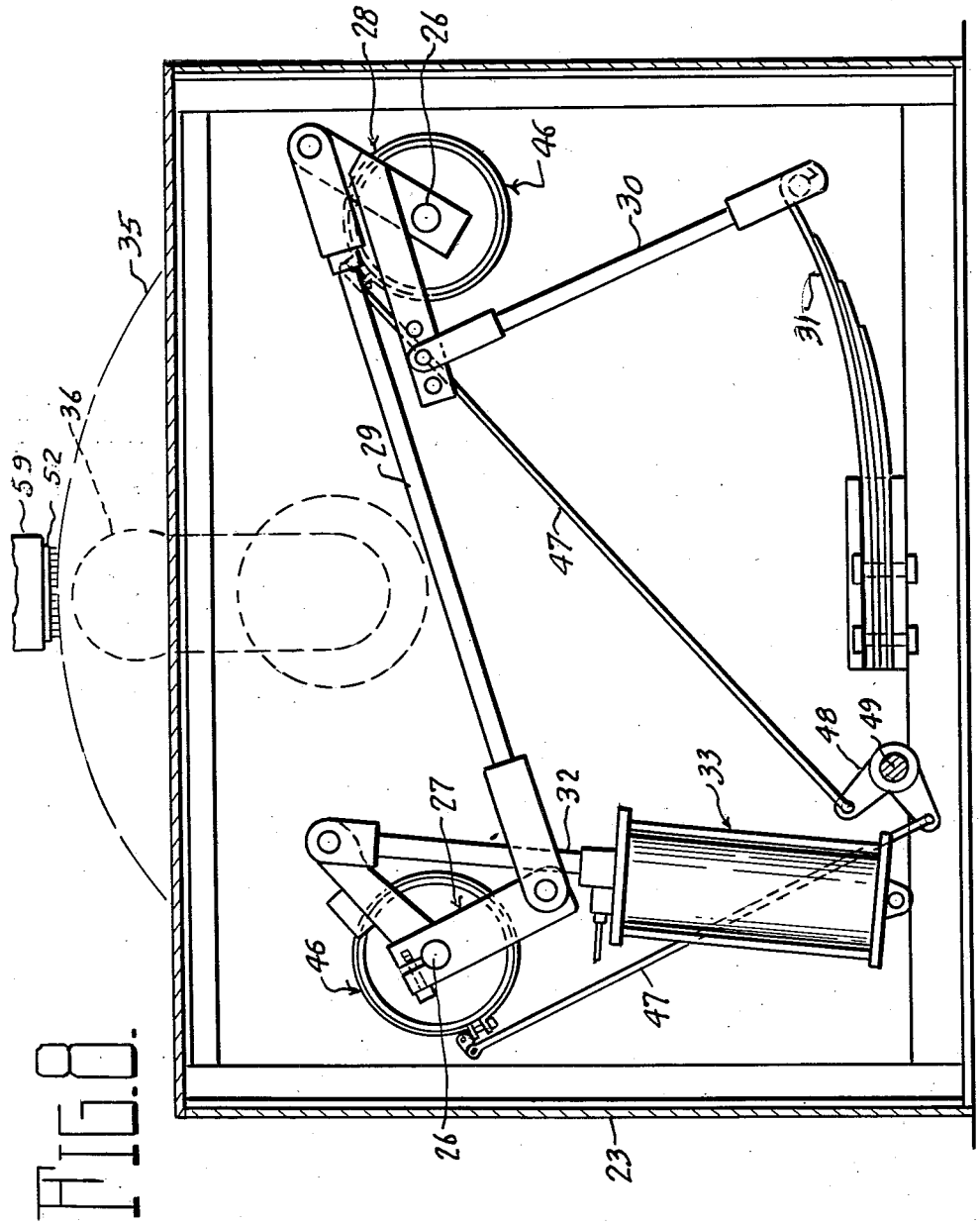

2,788,851

APPARATUS FOR AUTOMATICALLY BUFFING PNEUMATIC TIRE CASINGS

Vaughn Rawls and Robert W. La Warre, Lima, Ohio, said La Warre assignor of one-sixth to said Rawls, said Rawls assignor of six and two-thirds percent to Wesley O. Lones, Lima, Ohio, and said La Warre assignor of three and one-third percent to said Lones Application May 16, 1955, Serial No. 508,492

12 Claims. (Cl. 164—10.2)

This invention relates to an apparatus for automatically buffing and re-profiling pneumatic tire casings. This application is related to Rawls co-pending application Serial No. 475,401 which was filed December 15, 1954, and to which reference will be made herein for certain details of parts of the combination embodying the instant invention.

Apparatus embodying the instant invention also utilizes apparatus disclosed in Rawls co-pending application Serial No. 420,775 filed April 5, 1954, now Patent No. 2,734,553, which discloses an apparatus and method for the purpose of rebuilding pneumatic tires and to which the present application is, therefore, also related.

The rebuilding of pneumatic tire casings, called re-treading, has three major steps: first, the removal of the remainder of the old tread material; second, the application of the tread forming material called "camelback" to the prepared casing, and third, the vulcanization and molding of the camelback onto the casing.

The instant invention has to do with the preparation of pneumatic tire casings by the removal of the remaining old tread material from the casing and includes provision for re-profiling the casing and preparing its surface for the subsequent step of camelback adherence. The instant application thus has three objectives, first to remove the old tread material from the casing, second to re-profile the casing so that when the camelback is adhered and vulcanized in place the resulting tire will have a desired tread thickness balance and profile and, third, the preparation of the surface of the profiled casing to facilitate the adherence of the camelback thereto.

In conventional tire "buffing" operations the tire casing is rotated and an operator guides a high speed rotary buffing wheel across the surface of the tire to cut off the old tread material and to give it a proper profile. This conventional type of operation has two severe difficulties. It is very hard to rotate the tire truly on its axis without wobbling or without bucking, and second, it is almost impossible for an operator, no matter how skillful, to so accurately guide the buffing wheel as to prevent the inadvertent removal of either too much or insufficient material from the tire casing which spoils its profile and throws it completely out of balance.

Rawls application Serial No. 475,401 mentioned above, discloses an apparatus and method for buffing a tire casing according to a fixed profile where the operator guides the tire buffing wheel by moving its mounting means according to a template upon which the desired profile appears.

degree of accuracy and the buffing wheel is moved over the apparatus of Rawls application Serial No. 475,401 including an automatic drive and control whereby the tire casing is mounted and rotated on its axis with a high degree of accuracy and the buffing wheel is moved over a controlled predetermined path in order to buff the casing to a desired true profile by an automatic operation thus eliminating all problems of human frailty in achieving a balanced, buffed tire having a uniform profile.

It is the principal object of this invention therefore to provide an apparatus for buffing the surface of a pneumatic tire casing which is automatic in operation and which can be so modified in its operation as to accommodate tires of different sizes and of different profiles at will.

The apparatus and method of the instant invention, as well as that of application Serial No. 475,401, are advantageously combined with apparatus originally disclosed and claimed in application Serial No. 420,775 for the mounting and rotating of the tire itself in which the surface of the tire is stretched in order that it can be more easily cut by the buffing wheel points and so that its position is fixed with respect to the location of the buffing wheel surface and the tire casing therefore can be buffed to a uniform casing thickness and constant profile.

Other and more specific objects and advantages and their mode of achievement through the apparatus of the present invention will be better understood from reference to the specification which follows and from the drawings in which:

Fig. 1 is a somewhat diagrammatic view in elevation of an automatic tire casing buffing machine embodying the invention.

Fig. 2 is a fragmentary view in elevation, with parts shown in section, of the automatic control portion of the apparatus shown in Fig. 1.

Fig. 3 is a somewhat diagrammatic view, also in elevation and with parts broken away, taken from the left side of Fig. 1 or Fig. 2 and shown on the scale of Fig. 2.

Fig. 4 is a still further enlarged, fragmentary view in elevation of a portion of the mechanism illustrated in Figs. 2 and 3.

Fig. 5 is a vertical sectional view taken substantially along the line 5—5 of Fig. 4.

Fig. 6 is a fragmentary, detailed, isometric view of a portion of the apparatus illustrated in Fig. 4.

Fig. 7 is a plan view of the apparatus shown in Fig. 1.

Fig. 8 is an enlarged vertical sectional view taken substantially along the line 8—8 of Fig. 7.

Fig. 9 is a view similar to Fig. 8 but taken along the line 9—9 of Fig. 7.

Fig. 10 is a fragmentary, vertical sectional view taken along the line 10—10 of Fig. 9.

Fig. 11 is a fragmentary detailed sectional view on an enlarged scale taken along the line 11—11 of Fig. 1.

Fig. 12 is a fragmentary somewhat diagrammatic view taken generally from the position indicated by the line 12—12 of Fig. 1 but showing certain parts in positions different from those in which they are shown in Fig. 1.

Tire mounting and rotating apparatus

The apparatus illustrated in the drawings for the mounting and rotating of a tire casing is shown and described in greater detail in co-pending Rawls application Serial No. 420,775 and will be described in the instant application only in sufficient detail to generally illustrate its operation. The tire mounting and rotating apparatus shown in the drawings is generally indicated at 20. The apparatus 20 comprises a pair of double arm bell cranks 21 and 22 which protrude through the front wall of a casing 23 and have depending, angularly spaced pairs of arms 24 and 25. The bell cranks 21 and 22 (Fig. 7) are mounted on the forward ends of rearwardly extending horizontal shafts 26 at the rear of which (Fig. 8) are secured bell cranks 27 and 28. The bell cranks 27 and 28 are linked together by a tie rod 29 and through a tie rod 30 connected to a return spring 31. The bell crank 27 is linked to a piston rod 32 of a pneumatic or similar actuating cylinder generally indicated at 33. When air or other actuating force is admitted into the cylinder 33 the piston rod 32 is thrust downwardly in Fig. 8 which swings the bell crank 27 in a clockwise direction and the bell crank 28 in a counterclockwise direction placing tension upon the return spring 31. Referring again to Fig. 1, this action swings the two bell cranks 21 and 22 in a clockwise and counterclockwise direction respectively.

Each of the two arms 24 of the bell cranks 21 and 22 is provided with a flanged, casing bead roller 34 which is adapted to be engaged with the inner bead of a tire casing generally indicated at 35. By actuating the cylinder 33 and through the linkage described, swinging the arms 24 of the apparatus 20 downwardly, the tire casing 35 may be pulled downwardly over a generally hemispherical support sphere 36 (see also Figs. 9 and 10). The support sphere 36 comprises a pair of hemispheres 37 mounted upon opposite ends of a horizontal shaft 38 erected upon a vertical strut 39 and driven by a chain 40 from a horizontal jackshaft 41 suitably journaled in the casing 23 and protruding forwardly in a drive casing 42 parallel to the shafts 26 of the bell cranks 21 and 22 and intermediately spaced therebetween.

The drive shaft 41 is driven through the medium of a belt and pulley drive mechanism generally indicated in Fig. 9 and comprising a variable speed mechanism 43 driven from a motor 44. Energization of the motor 44 drives the two hemispheres 37 of the support and driving sphere 36 at a speed determined by the setting of the variable speed mechanism 43 and, by reason of the engagement between the surfaces of the hemispheres 37 and the inner surface of the tire casing 35, drawn downwardly over the hemispheres 37 by the action of the bell crank arms 24 as described above, rotates the tire casing 35 at a controlled speed and in a counterclockwise direction (Fig. 1).

Mounting a tire on the drive and support sphere 36 is accomplished by merely throwing the tire over the support sphere 36 so that the beads on the inner edge of the tire casing 35 rest upon the hemispheres 37. By then actuating the mechanisms described to swing the bell cranks 21 and 22 downwardly and engage the flanged rollers 34 with the path of the tire casing 35 and with the support sphere 36 rotating, the downward pressure from the bell cranks 21 and 22 pulls the tire casing downwardly over the support sphere 36. The pressure utilized in the cylinder 33 is selected so as to stretch the tire casing 35 over the drive sphere 36. By thus stretching the tire casing over the driving sphere 36 it is maintained in intimate surface contact with the drive sphere and the rubber from which the tire casing is fabricated, is tautened. This tautening of the rubber facilitates the entry thereinto of any sharp instrumentality such as the sharp points of the buffing wheel to be described below.

When the buffing operation has been completed and the surface of the tire casing 35 profiled and prepared for the adherence of camelback thereto, the tire casing 35 may be easily removed from the apparatus 20 by relieving the pressure in the cylinder 33 so that the energy stored in the return spring 21 swings the bell crank 27 in a clockwise direction (Fig. 7) and the bell crank 28 in a counterclockwise direction to swing the tire handling bell crank 21 in a counterclockwise direction (Fig. 1) and the crank 22 in a clockwise direction. This returning action swings the arms 25 upwardly and brings generally cylindrical idler rollers 45 that are mounted on the ends of the arms 25 on axes parallel to those of the rollers 34, into engagement with the exterior of the tire casing 35. The energy of the return spring 31 forces the crank arms upwardly and gradually lifts the tire casing 35 relative to the sphere 36, spreading its beads axially, to withdraw the casing off of the driving sphere 36.

A more complete description of the operation of the tire mounting and driving apparatus 20 will be found in the aforementioned application Serial No. 420,775 and in application Serial No. 475,401.

In addition to the mechanism already described and shown in more detail in the mentioned applications, the apparatus illustrated in the drawings of the instant application comprises a pair of brake drums and brakes generally indicated at 46 (Fig. 8) which are mounted upon the shafts 26 and connected by tie rods 47 to a bell crank 48 secured on the rear end of a shaft 49 which protrudes through the front of the casing 23 and has an actuation pedal 50 mounted thereon.

After the tire casing 35 is positioned over the support and driving sphere 36 in the manner described, the operator can step on the pedal 50 to lock the brakes 46 and thus to hold the shafts 26, the bell cranks 21 and 22 and the bead engaging rollers 34 in their drive positions, thereby eliminating all tendency of the tire casing to buck against the pressure in the actuating cylinder 33 under the varying load resulting from the buffing operation having to remove more or less rubber due to inequality in the degree of wear of the old tread on the tire casing.

*Tire buffing apparatus*

For the moment disregarding the automatic control features of the instant invention, the tire buffing section of the apparatus shown in the drawings and generally indicated in Fig. 1 by the reference number 51, comprises a buffing wheel 52 which is cylindrical in shape and the periphery of which is studded with an exceedingly large number of sharp protruding points. Conventionally such buffing wheel points are the sharp ends of large carpet tacks protruding through the thin peripheral material of the buffing wheel 51. In the embodiment of the invention illustrated in the drawings, the buffing wheel 52 is mounted on the front end of a shaft 53 journaled in and extending through a generally horizontal tube 54 which extends forwardly over the position of the tire casing 35 when mounted upon the apparatus 20. In the middle position of movement of the buffing wheel 53 the axis of its shaft 53 lies in the vertical median plane of the tire casing 35 which plane is normal to the axes of the tire casing 35, the support sphere 36 and the rim engaging rollers 34. Near the rear of the tube 54 it extends through and is operatively integral with a spherical member 55 of a spherical pillow block generally indicated at 56 which is erected on the upper end of a support tower 57. At the rear end of the tube 54, behind the sphere 55, there is secured a heavy-duty motor 58 the shaft of which is coupled to and drives the buffing wheel shaft 53.

The buffing wheel 52 is enclosed within a generally cylindrical housing 59 which is structurally a part of the buffing wheel mounting means and which surrounds the buffing wheel completely except for an arcuate opening generally indicated at 60 at its lowermost side through which the edge of the buffing wheel 52 protrudes. The housing 59 is rigidly connected to a forwardly extending guide tube 61 by a framework 62, the guide tube 61 being co-axial with the tube 54 and thus the buffing wheel drive shaft 53.

Because the axis of the buffing wheel 52 is perpendicular to the axis of the tire casing 35 and the buffing wheel 52 is swung in a generally arcuate path lying in the vertical plane of the axis of the tire casing 35, as the buffing wheel 52 is swung, its entire framework including the housing 59 tilts and the exposed portion of the buffing wheel 52 remains in buffing position. Thus the housing 59 almost entirely encloses the buffing wheel 52 and the housing 59 is connected by a pipe 63 to a suction dust collector for the purpose of carrying away the rubber dust and particles that are ground or ripped off the surface of the casing 35 in removing the old tread material and profiling the surface for the new tread material. This eliminates the usual dusty atmosphere existing in a tire buffing room and the accumulation of large amounts of rubber dust over the operators and the floor of the room.

At the front end of the guide tube 61 automatic mechanism generally indicated at 64 is provided for swinging the entire buffing wheel support means through a generally arcuate path, the mechanism being controlled and driven to be described below so that the surface of the buffing wheel moves over the surface of the tire casing 35 as the tire casing 35 rotates and buffs and profiles the tire casing 35.

In addition to the principal buffing wheel 52 which is utilized for removing the old tread from the surface of the tire casing 35 and for re-profiling the tire casing 35 in a manner to be described below, the apparatus illustrated in the drawings is provided with an auxiliary mechanism 65 (Fig. 1), the details of which are shown in Figs. 11 and 12. The purpose of this apparatus 65 is to touch up the margins of the sidewalls of the tire casing 35 beyond the re-profiling and the retreading area that is prepared by the main buffing wheel 52. The apparatus 65 comprises a motor 66 the shaft of which carries a smaller buffing wheel 67 and which is mounted to pivot on a vertical axis on the forward end of a carriage 68 supported for sliding movement forwardly and backwardly by a pair of rails 69 that are engaged between pairs of spaced rollers 70 (Fig. 11) positioned on the sides of the tower 57. The motor 66 has a hand crank 71 by which it may be swung on its vertical axis from the position indicated in solid lines in Fig. 12 to the position indicated by broken lines in Fig. 12 so that the areas on the tire casing 35 designated by the letters "B" in Fig. 12 are touched up by the buffing wheel 67; the area designated by the letter "A" being the area that is profiled and buffed by the main buffing wheel 52.

Control apparatus

The operation of the buffing wheel 52 from the standpoint of the determination of the amount of rubber to be removed from the surface of the tire casing 35 is controlled by the apparatus generally indicated at 64 in Fig. 1 and shown in detail in Figs. 2–6, inclusive. Referring to Fig. 2, the guide tube 61 is welded or otherwise rigidly secured at its forward end to a vertical plate 72 extending upwardly at the rear side of a slide casing 73. The slide casing 73 mounts a vertically movable slide 74 which is moved up and down by rotation of a handwheel 75 and may be locked in any selected position by a locking handwheel 76 bearing on its edge. On the lower end of the slide 74 a template engaging roller 77 is rotatably mounted.

The roller 77 is moved by mechanism to be described along the surface of a removable template 78 (see also Fig. 3) that is positioned on locating pins 79 protruding forwardly from a template frame 80 and held in place thereon by a template locking clamp 81. The template frame 80 is erected in the upper end of a vertical slidable plate 82 (Fig. 3) which moves in a pair of spaced vertical parallel gibs 83 located at the sides of a template support 84. The plate 83 is moved vertically by the engagement of a horizontally slidable wedge 85 with a beveled edge 86 cut on the lower edge of the plate 82. The slide 85 is threaded on a lead screw 87 on the outer end of which is mounted an adjustment wheel 88. The vertically movable plate 82 may be locked in any adjusted position by a locking wheel 89 extending through the side of the arms of the support 84 adjacent one of the gibs 83. Suitable indicia may be provided on the plate 82 and the gibs 83 to indicate to the operator when the plate 82 and thus the template 78 is at a desired vertical position.

Vertical adjustment of the position of the template 78 is required in order to adjust the mechanism for variations in the radial thickness of the wall of tire casings 35 of different sizes. The radial thickness of the wall of a tire casing of passenger car size is, of course, substantially less than the radial thickness of the wall of the casing of a tire used on a heavy-duty vehicle such as a truck, tractor or earth working machine. Inasmuch as the upper surface of the tire supporting and driving sphere 36 serve as a fixed reference point and engage the inner surface of the tire casing wall, when the buffing wheel 52 is run over the surface of the tire casing 35 it cannot be allowed to approach the surfaces of the support and driving sphere 36 closer than the desired minimum thickness of the casing wall after the buffing is completed. This adjustment is made by moving the template 78 up or down as the case might be for the particular type of tire being resurfaced.

The slide casing 73 has a front hollow portion comprising spaced vertical side walls 90 (Figs. 2 and 3) and a front wall 91 which forms a chamber open at its top and bottom and through which there extends an arm 92 by means of which the buffing wheel is swung through its arcuate path both under control of the control apparatus 64 or manually by an operator upon the completion of a buffing operation. The side walls 90 of the slide casing 73 are spaced from each other a distance only slightly greater than the outside diameter of the arm 92.

At the lower end of the arm 92 (Fig. 6) there is rigidly connected a bifurcated yoke 93 which straddles a driving lug 94 that is integral with or rigidly mounted on a clutch disk 95. The disk 95 is the driven half of a friction clutch generally indicated at 96 and also comprising a driving disk 97. The driving disk 97 is mounted on a rearwardly extending drive shaft 98 which extends through a large opening in the template mounting plate 82 and into a gear reduction transmission generally indicated at 99 which is driven by a motor 100 mounted upon the template supporting 84.

The shaft 98 is socketed and an extension shaft 101 set co-axially therein. The extension shaft 101 protrudes forwardly through an enlarged opening 102 extending through the driven disk 95 and the lug 94, being bifurcated at its forward end and carrying an eccentric locking handle 103. A coil spring 104 surrounds the shaft 101 and extends between the forward face of the lug 94 and a pressure washer 105 against which the eccentric portion of the locking handle 103 acts to compress the spring 104, exerting thrust against the driven disk 95 of the clutch 96 establishing a driving connection between the driving disk 97 and driven disk 95 by tightly squeezing the driven disk 95 against detent balls 106 that are rotably set in the face of the driving disk 97 and may be engaged in suitable sockets in the face of the driven disk 95.

The slide casing 73 and thus the template roller 77 are urged downwardly to maintain the roller 77 in surface contact with the template 78 by a spring 107 stretched between a finger 108 protruding forwardly from the upper front face of the lug 94 and an overcenter eccentric locking handle 109 pivotally mounting an ear 110 on the front face of the slide casing 73.

When the motor 100 is energized it rotates the shaft 98 and, when the clutch 96 is engaged, swings the handle 92 from its leftmost position (Fig. 3) to its rightmost position in a clockwise direction thus similarly sweeping the buffing wheel frame in an arcuate path and moving the buffing wheel around over the surface of the tire casing 35 along a path precisely determined by the engagement of the template roller 77 with the surface of the template 78. Because the tire casing 35 is rotating on its own axis and its wall is maintained in a fixed position by the intimate engagement with the driving sphere 36, a single pass of the high speed buffing wheel 52 from left to right across the tire removes all of the excess tread material down to a profile controlled by the template 78 and buffs the surface of the tire in the area indicated by the letter "A" in Fig. 12 in preparation for the camelback affixation.

The vertical adjustment of the slide 74 in the slide casing 73 raises or lowers the buffing wheel and thus increases or decreases the "radius" of the generally arcuate path of travel of the buffing wheel 52 around the exterior of the tire casing being buffed. This path, like the minimum distance between the surface of the buffing wheel 52 and the surface of the support sphere 36 must be varied for tires of different sizes. Similarly, therefore, suitable indicia may be located on the slide 74 and slide casing 73. Thes indicia for convenience sake may appear on the face of the particular template 78 for the particular size of tire being buffed.

When an operator is preparing to buff a tire on apparatus embodying the invention, he flips the handle 103 downwardly relieving pressure between the faces of the clutch 96 and then flips the lever 109 releasing the tension on the spring 107. Because the heavy-duty motor 58 is behind the spherical pivotal block 56, an operator can lift the slide casing 73 upwardly along the arm 92 and, grasping the arm 92, swings it and the entire buffing mechanism to the left (Fig. 3) until the template roller 77 reaches its farthest position and may be placed to rest upon a template wing 111 protruding horizontally from the template support 80. The operator then places the correct template 78 for the size of tire to be buffed in its position on the locating pin 79, makes whatever adjustments are necessary in the position of the vertically movable template slide 82 and the template roller slide 74 and then moves the levers 103 and 109 upwardly to place tension upon the members of the clutch 96 and to hold the rollers 77 enegaged with the profile of the template 78.

The operator then mounts the tire on the apparatus 20 in the manner described and energizes the tire driving motor. Because of the uniformity of the tension exerted on the tire by the bead rollers pulling it downwardly over the driving sphere 36, the tire rotates on its own axis and its median plane does not wobble. After the tire casing 35 has reached its appropriate speed of rotation, the operator energizes the motor 100 which, through the drive mechanism described, swings the arm 92 in a clockwise direction (Fig. 3) with the template rollers 77 following the template 78 and the surface of the buffing wheel 52 thus being moved through a pathway controlled and determined by the template 78. When the arm 92 has been swung to its limit at the right, it or an associate piece of mechanism actuates a conventional suitably positioned limit switch to de-energize the motor 100. The operator then swings the buffing mechanism 51 to its left position as described above allowing the tire driving motor to continue running. He then moves to the back of the machine and sliding the apparatus 65 forwardly on its rails 69, briefly swings the auxiliary buffing wheel 67 into contact with the marginal portions of the tire casing 35. This cleans these areas for adherence of the margins of the new tread material thereto. He then returns the apparatus 65 to the position shown in Fig. 1, releases the brake pedal mechanism 50 and vents the cylinder 33. As the tire casing 35 continues to rotate, the arms 25 of the bell cranks 21 and 22 swing the rollers 45 upwardly into engagement with the exterior of the buffed tire casing 35 and lift it off the driving sphere 36. The operator then de-energizes the tire rotating motor 44, removes the tire casing 35 and is ready to buff a second tire casing.

We claim:

1. Apparatus for buffing the exterior of a pneumatic tire casing including means for mounting and power means for rotating said casing on its own axis, said apparatus comprising a buffing wheel mounting arm pivotally mounted at one end in the median plane of said tire casing and extending longitudinally over said tire casing when said tire casing is in mounted position, means for pivotally mounting said arm for universal angular movement over said tire casing, a buffing wheel rotatably mounted on said arm with the periphery of said wheel in position to contact the tread portion of said tire casing, means for removably mounting a casing profile template in position aligned with the median plane of said casing and the pivot point of said arm with said template extending transversely to such plane, said buffing wheel arm extending to a position adjacent said template mounting means, a template contactor mounted on said arm in position to contact said template and power driven means for swinging said arm for moving said contactor over the surface of said template whereby said buffing wheel is moved over the surface of said casing along a path determined by said template.

2. Apparatus for buffing the exterior of a pneumatic tire casing including means for mounting and power means for rotating said casing on its own axis, said apparatus comprising a buffing wheel mounting arm pivotally mounted at one end in the median plane of said tire casing and extending longitudinally over said tire casing when said tire casing is in mounted position, means for pivotally mounting said arm for universal angular movement over said tire casing, a buffing wheel rotatably mounted on said arm with the periphery of said wheel in position to contact the tread portion of said tire casing with the axis of said buffing wheel extending generally normal to the axis of said casing, means for removably mounting a casing profile template in position aligned with the median plane of said casing and extending transversely thereto, said buffing wheel arm extending to a position adjacent said template mounting means, a template contactor mounted on said arm in position to contact said template and power driven means for swinging said arm for moving said contactor over the surface of said template whereby said buffing wheel is moved over the surface of said casing along a path determined by said template.

3. Apparatus according to claim 2 in which the template contactor is adjustably connected to said buffing wheel mounting arm whereby said arm may be adjustably spaced relative to the surface of a template contacted by said template contactor.

4. Apparatus according to claim 2 in which said template is adjustable vertically relative to said tire mounting means.

5. In an apparatus for buffing a tire casing having a driving sphere adapted to fit interiorly of the tire casing and to support said tire casing for rotation on its axis, a buffing wheel mounting arm pivotally mounted for movement over the surface of said casing, a buffing wheel rotatably mounted on said arm in position for buffing said casing, means for mounting a casing template in a position aligned with said driving sphere, a template contactor on said buffing wheel mounting arm, power driven means for moving said buffing arm through a path determined by contact of said contactor with said template, means for adjusting the spatial relation of said contactor and said arm and means for adjusting the vertical position of said template relative to said driving sphere.

6. Apparatus according to claim 5 in which the power driven means includes a slide block on the end of said buffing wheel mounting arm, a power arm extending through said slide block and angularly driven through a path in a plane parallel to the axis of said tire casing and said driving sphere, a driving motor and a releasable clutch interposed between said driving motor and said power arm.

7. Apparatus according to claim 6 in which the template contactor is adjustably mounted on said slide block.

8. Apparatus according to claim 7 in which the axis of said driving sphere is horizontal, said buffing wheel mounting arm extends thereover and the plane of its mid position is normal to the axis of said driving sphere, the axis of said buffing wheel lies in such plane, and the axis of movement of said power arm also lies in such plane at mid position thereof.

9. Apparatus for buffing the exterior tread surface of a pneumatic tire casing to a desired transverse profile, said apparatus comprising a driving sphere adapted to be inserted into the interior of the casing for supporting said casing and for rotating said casing on its axis, at least one roller engaging the inner edges of the rim beads of said casing and means for forcibly translating said roller means away from said sphere for stretching said casing over said sphere, a power driven rotatable buffing wheel, means for removably mounting a casing profile template extending transversely of said tire casing, an arm for mounting said buffing wheel for translatory movement over the tread surface of said casing exteriorly of said driving sphere, a template contactor adjustably mounted in said arm and means for adjusting the position of said template mounting means and the profile of said template relative to said driving sphere.

10. Apparatus for reforming the outer peripheral tread surface of a pneumatic tire casing comprising means for mounting said tire for rotation on its major axis, means for stretching areas of the peripheral surface of said tire casing progressively around the perimeter of said tire as said tire is rotated, an arm extending over said tire casing when mounted on said mounting means, a rotary buffing wheel mounted on and movable by said arm generally transversely over the surface of said tire casing at such stretched area a profile template removably mounted near said tire casing, means on said arm for contacting the surface of said template and power driving means for moving said arm along a path across said tire casing determined by said template for guiding said buffing wheel across said tire casing.

11. Apparatus according to claim 10 in which said arm is universally pivoted at one end in the median plane of the tire casing when mounted for rotation, said template contacting means is mounted on the opposite end of said arm and said buffing wheel is mounted on said arm in a position intermediate the ends of said arm.

12. Apparatus according to claim 11 in which the power driven arm moving means comprises a swinging bar movable angularly in a plane parallel to the axis of said casing and the end of said buffing wheel arm slidingly engages said bar.

References Cited in the file of this patent

UNITED STATES PATENTS

| | | |
|---|---|---|
| 1,745,021 | Tieban | Jan. 28, 1930 |
| 2,009,524 | Schmidt | July 30, 1935 |
| 2,086,254 | Browning | July 6, 1937 |
| 2,116,512 | Ericson et al. | May 10, 1938 |
| 2,167,017 | Wikle | July 25, 1939 |
| 2,178,665 | Janowski | Nov. 7, 1939 |